(12) United States Patent
Terano

(10) Patent No.: US 6,989,518 B2
(45) Date of Patent: Jan. 24, 2006

(54) METHOD OF SEALING A FOIL CAP TO A CONTAINER

(75) Inventor: Robert J. Terano, Nesconset, NY (US)

(73) Assignee: Lepel Corp., Edgewood, NY (US)

( * ) Notice: Subject to any disclaimer, the term of this patent is extended or adjusted under 35 U.S.C. 154(b) by 0 days.

(21) Appl. No.: 10/784,070

(22) Filed: Feb. 21, 2004

(65) Prior Publication Data

US 2004/0164070 A1    Aug. 26, 2004

Related U.S. Application Data

(62) Division of application No. 10/026,508, filed on Dec. 18, 2001, now Pat. No. 6,713,735.

(60) Provisional application No. 60/259,202, filed on Dec. 29, 2000.

(51) Int. Cl.
*H05B 6/10* (2006.01)
*H05B 6/42* (2006.01)
*B65B 51/10* (2006.01)

(52) U.S. Cl. ............. 219/633; 219/632; 219/677; 53/329.2; 156/274.2; 336/61

(58) Field of Classification Search ........ 219/632–635, 219/644, 677, 672, 670; 53/329.2; 156/272.4, 156/69, 274.2, 379.7, 380.2; 336/55, 61, 336/62

See application file for complete search history.

(56) References Cited

U.S. PATENT DOCUMENTS

| | | | |
|---|---|---|---|
| 4,508,481 A | * | 4/1985 | Ishibashi et al. ............ 156/69 |
| 4,521,659 A | * | 6/1985 | Buckley et al. ............ 219/633 |
| 5,025,123 A | * | 6/1991 | Pfaffmann et al. .......... 219/633 |

* cited by examiner

*Primary Examiner*—Philip H. Leung
(74) *Attorney, Agent, or Firm*—Philip O. Post

(57) ABSTRACT

A method of sealing a foil cap to the opening of a container by induction heating is provided. A heat pipe is used to transfer heat from an induction sealing head assembly.

2 Claims, 6 Drawing Sheets

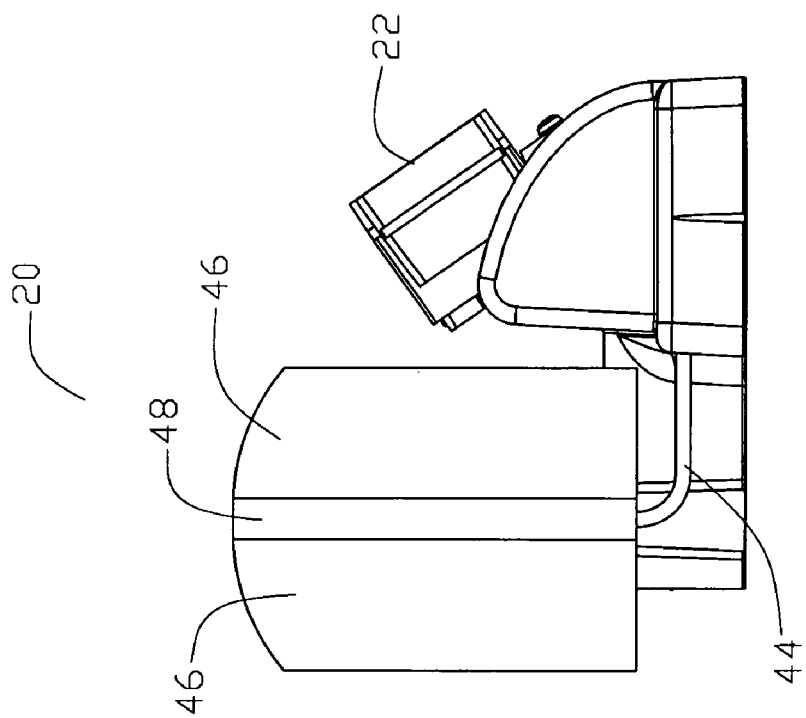
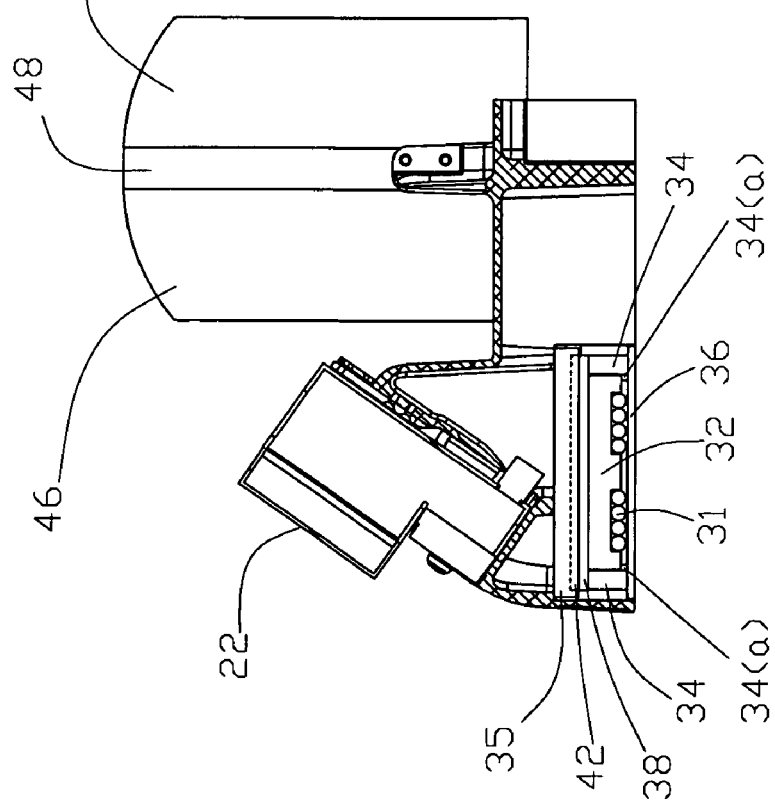

METHOD OF SEALING A FOIL CAP TO A CONTAINER

CROSS REFERENCE TO RELATED APPLICATIONS

This application is a division of U.S. application Ser. No. 10/026,508, filed Dec. 18, 2001, now U.S. Pat. No. 6,713,735, which claims priority to provisional patent application Ser. No. 60/259,202 filed Dec. 29, 2000, the entirety of each of which are incorporated herein by reference.

FIELD OF THE INVENTION

The present invention relates generally to an induction foil cap sealer, and specifically to a modular induction foil cap sealer that is efficiently cooled without the use of either cooling water or forced air cooling.

BACKGROUND OF THE INVENTION

It is known in the art to secure metal foil seals to the cap of a container by passing the cap with the metal foil seal seated on it through a magnetic field generated by applying a high frequency current to an inductor coil. The magnetic field inductively heats the metal foil, which in turn heats and cures a sealing material adhering to the foil. The sealing material, typically a thermoplastic resin, sets and seals to the lip of the container's opening. Known foil cap sealers have components that require water cooling and/or forced air cooling. For example, the inductor could be a hollow copper tubing or bus bar that is cooled by running water through the hollow passage of the tubing or bus bar. The use of Litz wire, which is known in the art, reduced heat losses to the extent that forced conduction air cooling of the foil cap sealer became feasible. Forced conduction air cooling, with the requirement for one or more typically electrically driven fans, requires additional energy consumption and increases the volume and weight of the foil cap sealing equipment.

Additionally, foil cap sealers known in the art consist of a unitary enclosure that includes the sealing head and a high frequency power supply. The unitary enclosure must be supported and suspended over a processing line that transports the caps of the containers under the sealing head to heat the foil seals. This arrangement substantially increases the weight that must be supported over the processing line. Additionally, failure in the power supply or failure in the sealing head will necessitate the replacement of the entire foil cap sealer's unitary enclosure.

Therefore, there exists the need for a modular air-cooled, energy efficient induction cap sealer that will not require forced air or water cooling.

BRIEF SUMMARY OF THE INVENTION

In one aspect, the present invention is an induction foil cap sealer that is used to secure a foil cap to the cap of a container. The foil sealer includes a sealing head module and a power supply module. A coil assembly is provided in the sealing head module. The coil assembly includes a magnetic flux concentrator, such as a ferrite core, and an air-cooled inductor disposed adjacent to the magnetic flux concentrator. In one embodiment of the invention, a frame surrounds the sides of the core and a cover plate is attached to the top of the ferrite coil and inductor. At least one evaporator element of one or more heat pipes is in contact with the magnetic flux concentrator. A thermally conductive material, such as a coil plate, may be inserted between the magnetic flux concentrator and the at least one evaporator element. Means are provided for connecting the evaporator elements to at least one condenser element of the one or more heat pipes so that the heat pipe's heat media can transfer heat from the evaporator to the condenser elements. In one embodiment of the invention, the inductor is a Litz wire that is seated in a ferrite core. The ferrite core is formed from U-shaped ferrite segments. A control panel may be included with the sealing heading module or may be remotely located.

In another aspect the present invention is a method of sealing a foil cap seated on the cap of a container to the cap. A sealing head assembly is provided with an air-cooled inductor disposed adjacent to a magnetic flux concentrator, such as a ferrite core. An ac current is provided to the inductor from a power supply that is located remotely from the sealing head assembly. Current flow through the inductor creates a magnetic field that generates heat in the ferrite core. Generated heat is transferred to ambient air without the requirement for water cooling or forced air cooling. These and other aspects of the invention are set forth in the specification and appended claims.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

FIG. 3 is a cross-sectional view of a sealing head module with sectioning plane defined by line A—A in FIG. 2.

FIG. 4 is a side elevational view of a sealing head module.

DETAILED DESCRIPTION OF THE INVENTION

Figure 1:
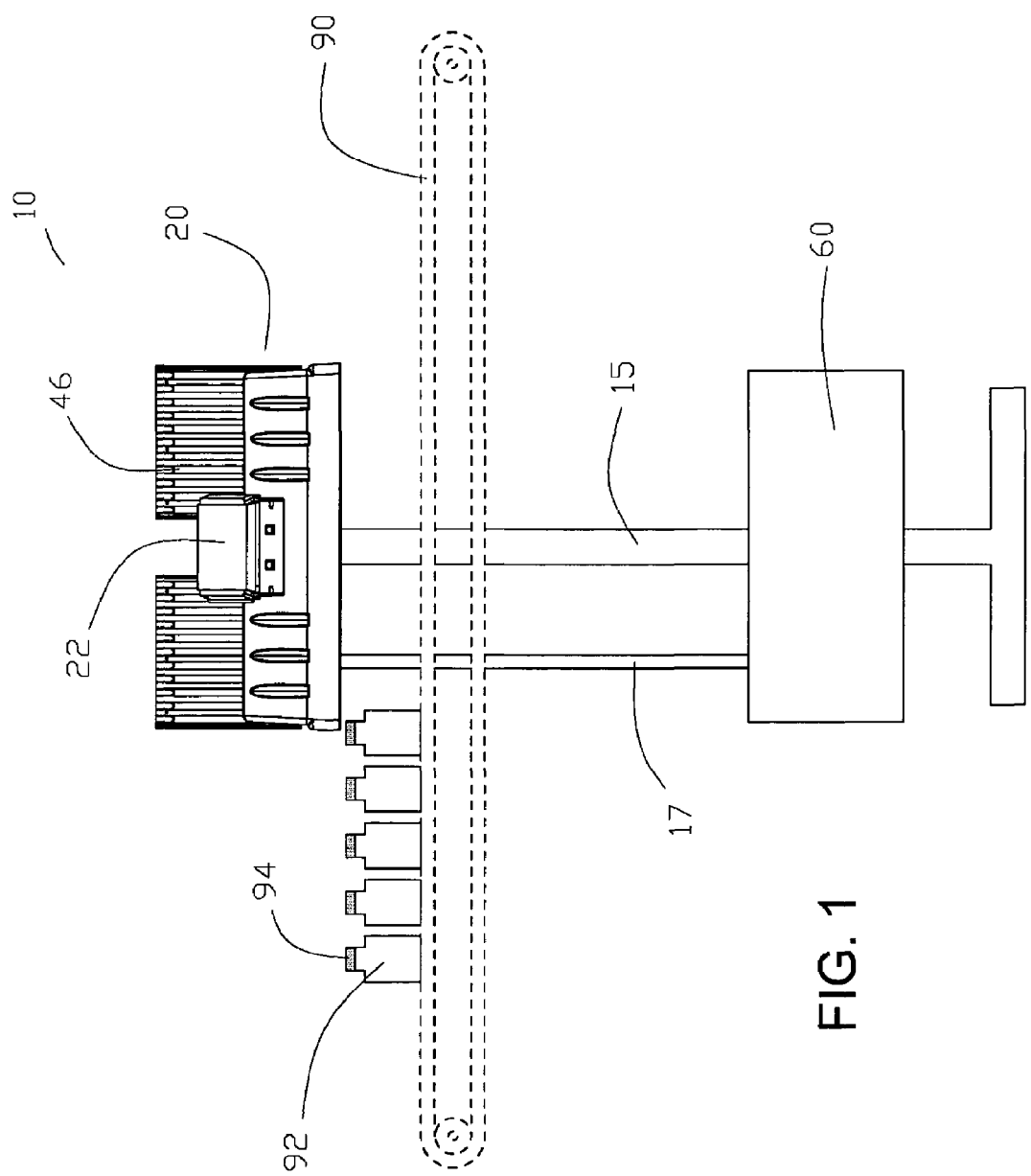
FIG. 1 is a front elevational view of one example of an induction foil cap sealer of the present invention.
Figure 2:
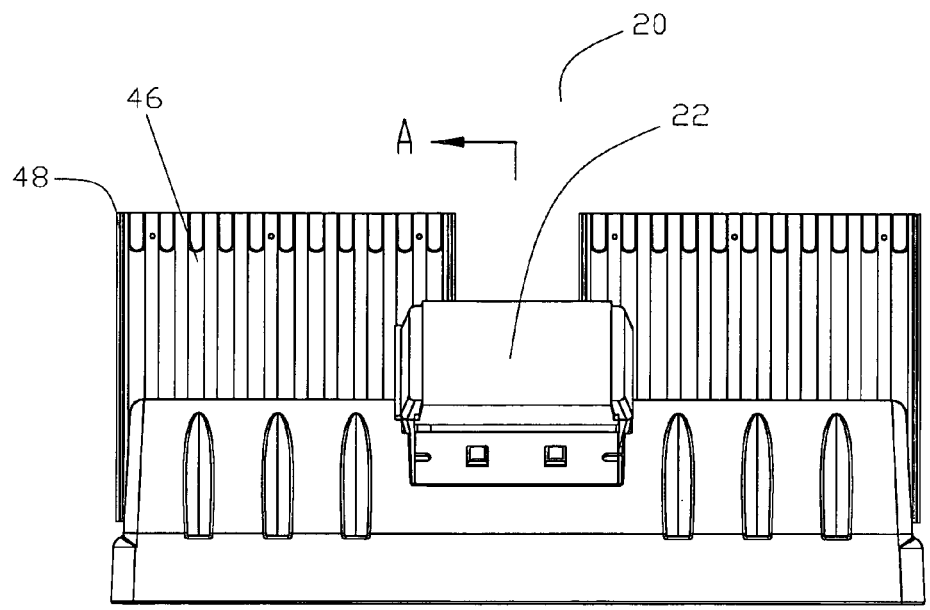
FIG. 2 is a front elevational view of one example of a sealing head module used with an induction foil cap sealer of the present invention.
Figure 5:
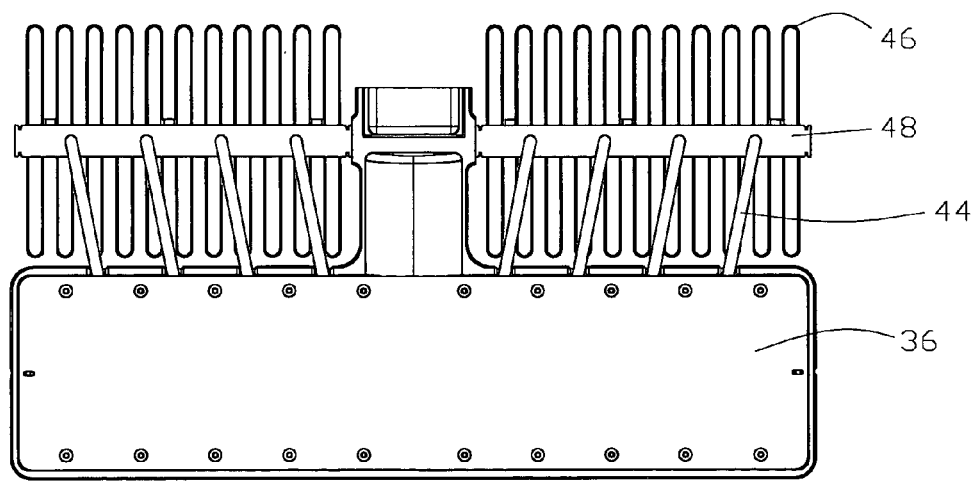
FIG. 5 is a bottom view of a sealing head module.

Referring now to the drawings, wherein like numerals indicate like elements there is shown in the figures one example of an induction foil cap sealer 10 of the present invention. The foil cap sealer comprises a sealing head 20 and a power supply 60 suitably mounted on support structure 15. The power supply module is separate from the sealing head module, that is, the power supply module is located remotely from the sealing head module. One or more electrical conductors 17 are used to connect the ac output of the power supply to an inductor in the sealing head, and to provide control signals between the sealing head and the power supply. Sealing head 20 is suitably mounted relative to conveyor means 90 (shown in dashed lines in FIG. 1) so that containers 92 travel under the bottom of the sealing head. The magnetic field generated by current flowing through the inductor in the sealing head 20 is used to inductively heat a conductive foil that has been inserted within cap 94 of a container. The foil in turn heats a temperature sensitive material associated with the foil so that the material melts and then adheres to the lip of the container's opening to form a tamperproof seal. Although power supply 60 is shown mounted on the same structural support as that for the sealing head, in alternative examples, the power supply may be located in other remote locations. The operating ac output frequency of the power supply will depend upon the particular application of the foil cap sealer.

FIG. 2 through FIG. 8 show further details of the sealing head 20. The sealing head includes a coil assembly 30, as further disclosed below, and elements of one or more heat pipes 40 that serve as a heat exchanger to remove heat generated primarily in the ferrite core by the induced magnetic field produced by ac current flow in the inductor, and in the inductor from the ac current flow. The ferrite core serves as a magnetic flux concentrator. Typically, the sealing head will also include a control panel 22, which in this example is mounted in an enclosure oil the sealing head. The control panel incorporates suitable operator interfaces such as pushbuttons, keypads and visual display devices. In alternative examples, the control panel may be remotely located.

Figure 6:
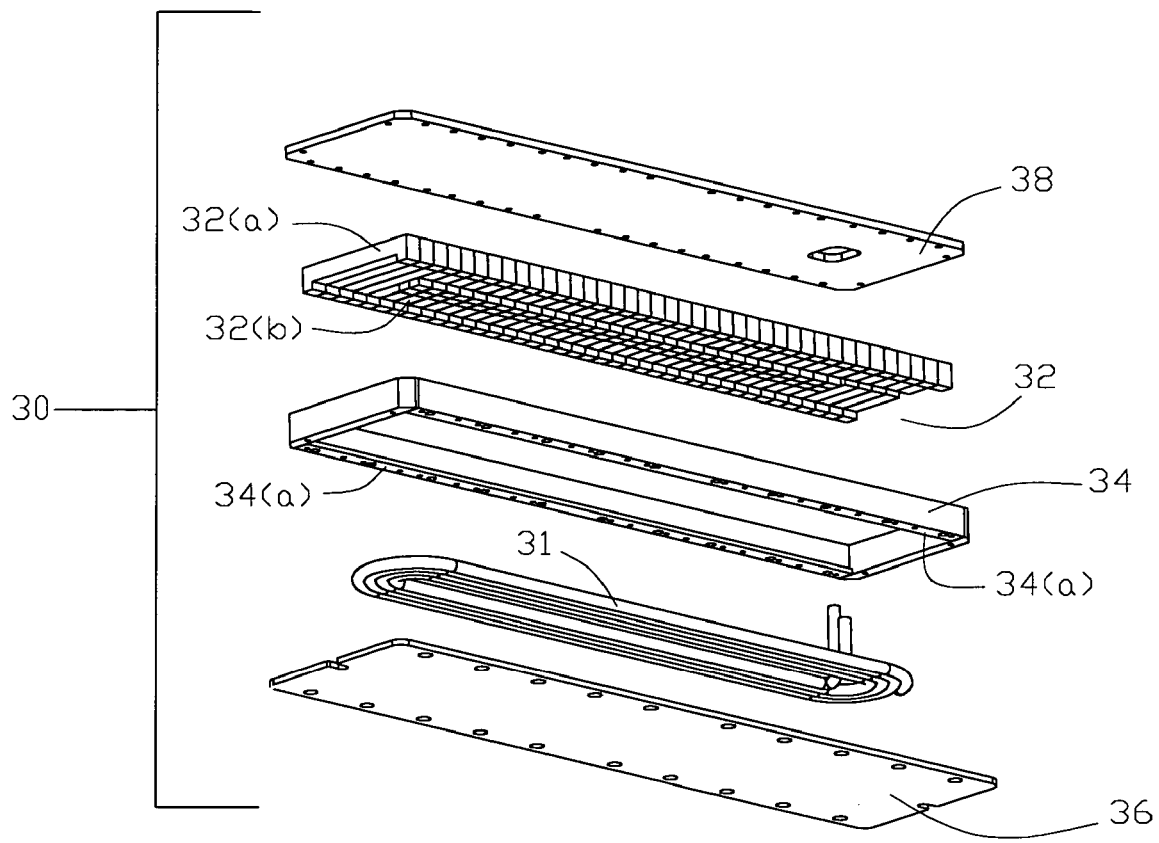
FIG. 6 is an exploded perspective view of a coil assembly used with an induction foil cap sealer of the present invention.
Figure 7A:
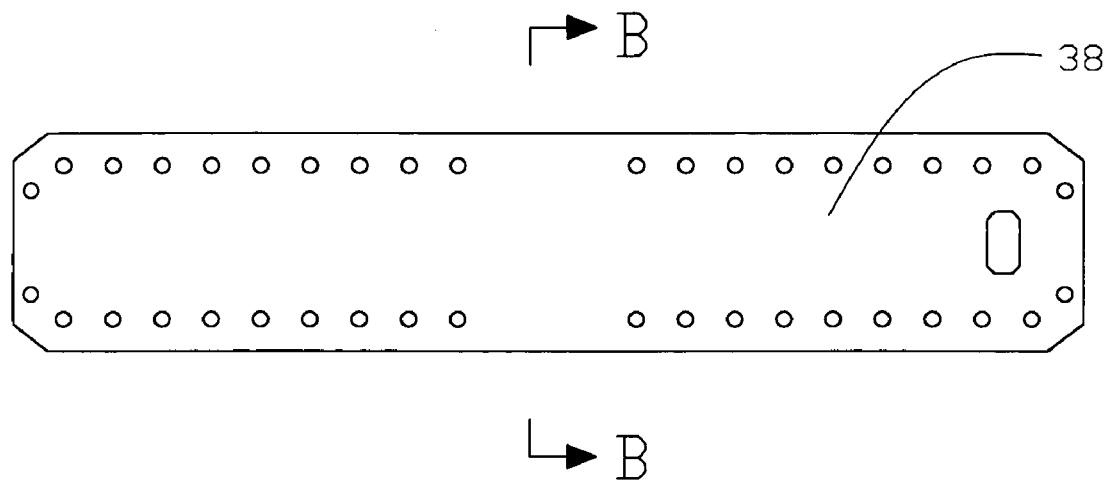
FIG. 7(a) is a top view of an assembled coil assembly.
Figure 7B:
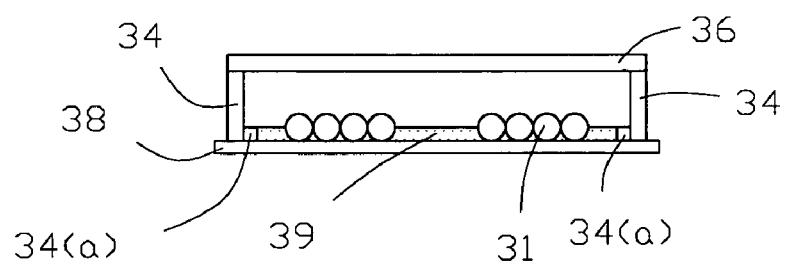
FIG. 7(b) is a cross-sectional view of an assembled coil assembly with sectioning plane defined by line B—B in FIG. 7(a).

As best illustrated in FIG. 6 and FIG. 7(b), inductor 31 is seated in a ferrite core 32 for this example of the foil cap sealer of the present invention. In other examples of the invention the inductor is disposed adjacent to a magnetic flux concentrator, such as a ferrite core. In the present example, inductor 31 comprises a Litz wire with strand count and gauge suitably selected for the applied frequency range of power in a particular application. Litz wire selections will generally be for operating power frequencies between 50 and 200 kHz. Other types of air-cooled inductors with suitable current densities and heat dissipation rates can also be used. Further in alternative examples of the invention, two or more air-cooled inductors can be arranged in ferrite core 32 to suit a particular application. In the example shown in FIG. 6, the ferrite core comprises multiple U-shaped ferrite segments, which are assembled to provide a seating volume for inductor 31. The ferrite segments consist of two types, namely long segments 32(a) and short segments 32(b). Alternative configurations for the ferrite segments can be used. A non-electrically conductive frame 34 is disposed around the sides of the ferrite core. The frame includes a longitudinal, non-electrically conductive strip 34(a) that is disposed along the longitudinal bottom surface of the exterior "U" legs of the ferrite segments. A suitable but not exclusive material for the frame and strips is a NEMA Grade G-10 epoxy/glass composition. Cover plate 36 closes the coil opening within frame 34, and can be formed from a suitable high temperature plastic or other non-electrically conductive material. The cover plate provides physical containment and protection of the inductor and is not essential in all embodiments of the present invention. The frame, strips, and cover plate form an enclosure for the ferrite core and inductor. The detailed form and configurations of these components will vary as the shape of the ferrite core and inductor vary. Other methods of enclosure or a ferrite core and inductor without enclosure can be employed with the foil cap sealer of the present invention. Coil plate 38 attaches to the base of the ferrite core. The coil plate is formed from a suitable thermally conductive material such as aluminum. As illustrated in FIG. 7(b) a thermal epoxy 39 or other suitable filler material can be used to fill the voids in an assembled coil assembly to ensure proper seating of the inductor against the ferrite core.

One side of plate 35 provides a suitable means for attachment of coil assembly 30 as shown in FIG. 3. The opposing side of the plate provides a suitable means for: mounting electrical components associated with inductor 31, such as a power transformer and a capacitor for tuning an LC circuit formed by the inductor and the capacitor; connecting components that may be required for electrical conductors 17 from power supply 60; and connecting means for the terminating ends of inductor 31 to components mounted on the plate. In alternative arrangements, coil plate 38 may also serve as the mounting means for the above components without the need for plate 35. Selection of an operating frequency is based upon operating parameters (such as the speed of conveyor means 90) of foil cap sealer 10 and the configuration (such as the diameter of the opening of a container) of containers 92. The capacitor is selected for optimum operating efficiency of the LC circuit at the selected operating frequency. If a change in operating frequency is desired, the capacitor can be replaced with another capacitor having an appropriate capacitance for optimum efficiency of the LC circuit without changing inductor 31.

Figure 8:
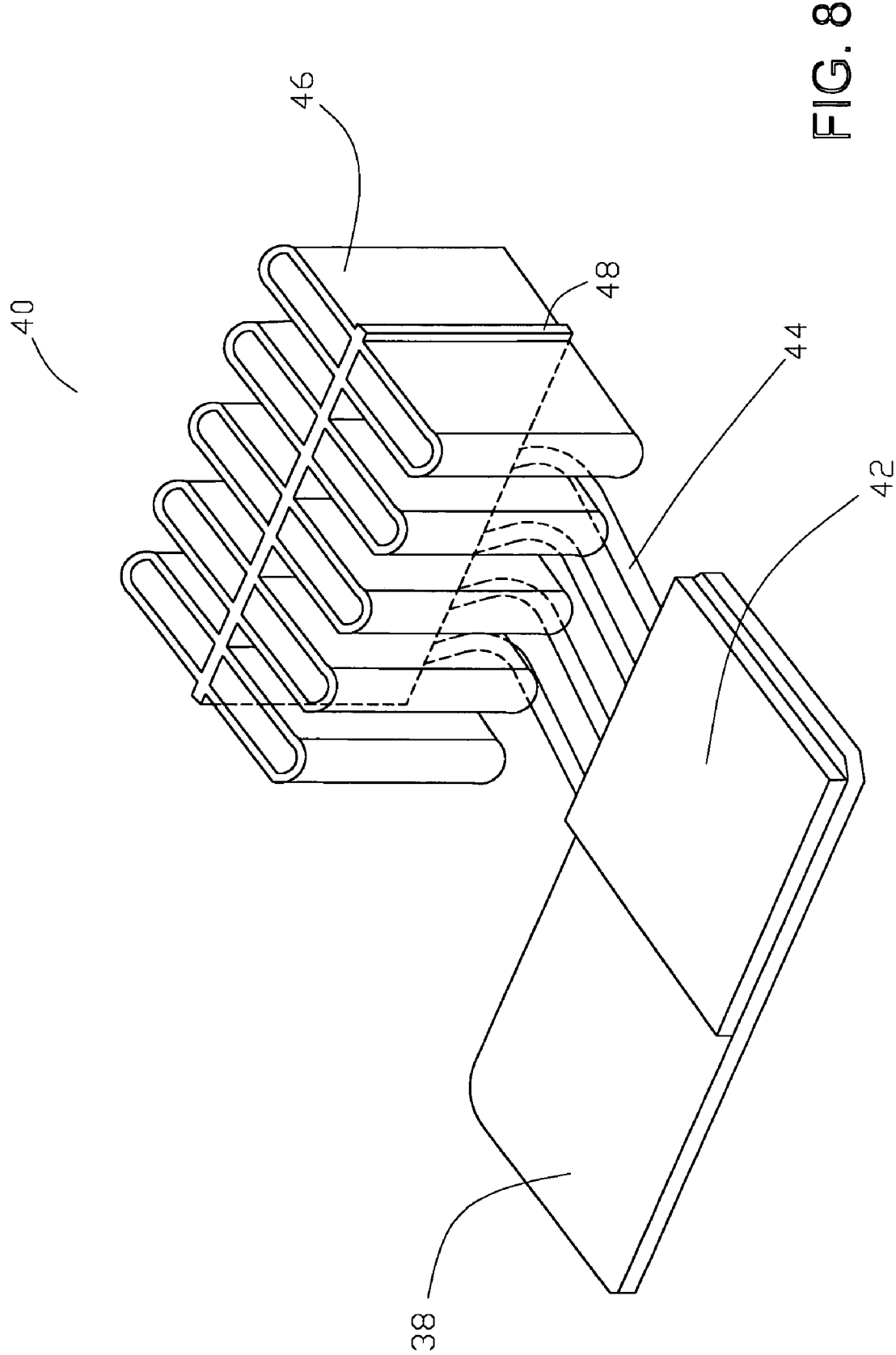
FIG. 8 is one example of a heat pipe used with an induction foil cap sealer of the present invention.

The typical heat pipe configuration used with the modular induction foil cap sealer is shown in FIG. 8. Evaporator elements 42 of one or more heat pipes 40 are placed in close contact with coil plate 38. Heat created primarily in the ferrite core 32 and air-cooled inductor 31 is conducted away from the core through the coil plate and to evaporator elements 42 of the heat pipe. The ferrite core 32 and inductor 31 are the primary sources of heat generation when an ac current is flowing through the inductor. As mentioned above coil plate 38 serves as a thermally conductive material. In alternative examples of the invention, the evaporator elements 42 may be disposed directly adjacent to the ferrite core or magnetic flux concentrator to remove heat from the ferrite core and inductor. The heat transfer media, such as a water-based fluid or other suitable liquid, contained within the sealed evaporator elements 42 absorbs the heat. Each connecting tube 44 has one end of its interior passage connected to the sealed interior of an evaporator element, and the opposing end connected to the sealed interior of a condenser element 46. The connecting tube serves as a connector that provides a path for the heat transfer media from an evaporator element to a condenser element. The heated media moves through the one or more connecting tubes 44 to the one or more condenser elements 46 in which the transfer media radiates heat to the surrounding ambient medium, which is generally air within a normal room temperature range. The condenser elements are designed for a particular application to have a sufficient surface area that will result in an adequate heat dissipation rate at rated output of the power supply so that forced air (fan) cooling or water (or other fluid) cooling of the ferrite core and other sealing head elements is not required. The selection and arrangement of heat pipe elements will depend upon the arrangement of the coil assembly and the required heat dissipation rate. Additionally the condenser elements may be optionally attached to radiating elements, such as finned radiators, to further increase the heat transfer rate to air. In alternative embodiments, the evaporator elements may be directly in contact with the ferrite core.

For the particular example shown in FIG. 1 through FIG. 8, two heat pipes are used. Each heat pipe 40 consists of a single evaporator element 42 that uses four connecting tubes 44 for connection to a plurality of condenser elements 46 via a common plenum 48. Each condenser element is "U" shaped with sufficient spacing between surfaces to allow maximum radiated heat transfer from the heat pipe's media to the surrounding ambient air. Further, in this example, the planar face of each condenser elements 46 is oriented at an angle of substantially 90 degrees with the planar surface (substantially parallel to coil plate 38, if used, and ferrite core 32) of each evaporator element 42 and disposed relative to the structure of the sealing head to give them optimum exposure to the surrounding air for a maximum dissipation of heat load. Other configurations of heat pipe 40, including quantity of heat pipes, quantity of evaporator and condenser elements, and connecting tubes, and orientation of the same can be used as appropriate for a particular design of the foil cap sealer of the present invention.

The foregoing embodiments do not limit the scope of the disclosed invention. The scope of the disclosed invention is further set forth in the appended claims.

What is claimed is:

1. A method of sealing a foil cap to the opening of a container comprising the following steps:

providing a sealing head assembly having an air-cooled inductor disposed adjacent to a magnetic flux concentrator;

providing an ac current to the air-cooled inductor from a power supply located remotely from the sealing head assembly to generate a magnetic field in the air-cooled inductor, the magnetic field creating heat primarily in the non-water cooled, air-cooled inductor and the magnetic flux concentrator;

placing an at least one evaporator element of a heat pipe in contact with the magnetic flux concentrator; and transferring heat from the at least one evaporator element to an at least one condenser element of the heat pipe, whereby the heat is transferred from the sealing head assembly to an ambient medium surrounding the at least one condenser element.

2. A method of sealing a foil cap to the opening of a container comprising the following steps:

providing a sealing head assembly having an air-cooled inductor disposed adjacent to a magnetic flux concentrator;

providing an ac current to the air-cooled inductor from a power supply located remotely from the sealing head assembly to generate a magnetic field in the air-cooled inductor, the magnetic field creating heat primarily in the non-water cooled, air-cooled inductor and the magnetic flux concentrator;

placing a thermally conductive material in contact with the magnetic flux concentrator;

placing an at least one evaporator element of a heat pipe in contact with the thermally conductive material; and transferring heat from the at least one evaporator element to an at least one condenser element of the heat pipe, whereby the heat is transferred from the sealing head assembly to an ambient medium surrounding the at least one condenser element.

* * * * *